Aug. 20, 1940.    G. G. COLBERT    2,211,812
APPARATUS FOR THE DISPOSAL OF DUST
Filed March 28, 1938    2 Sheets-Sheet 1

INVENTOR
George G. Colbert
By his attorney
Victor Coll

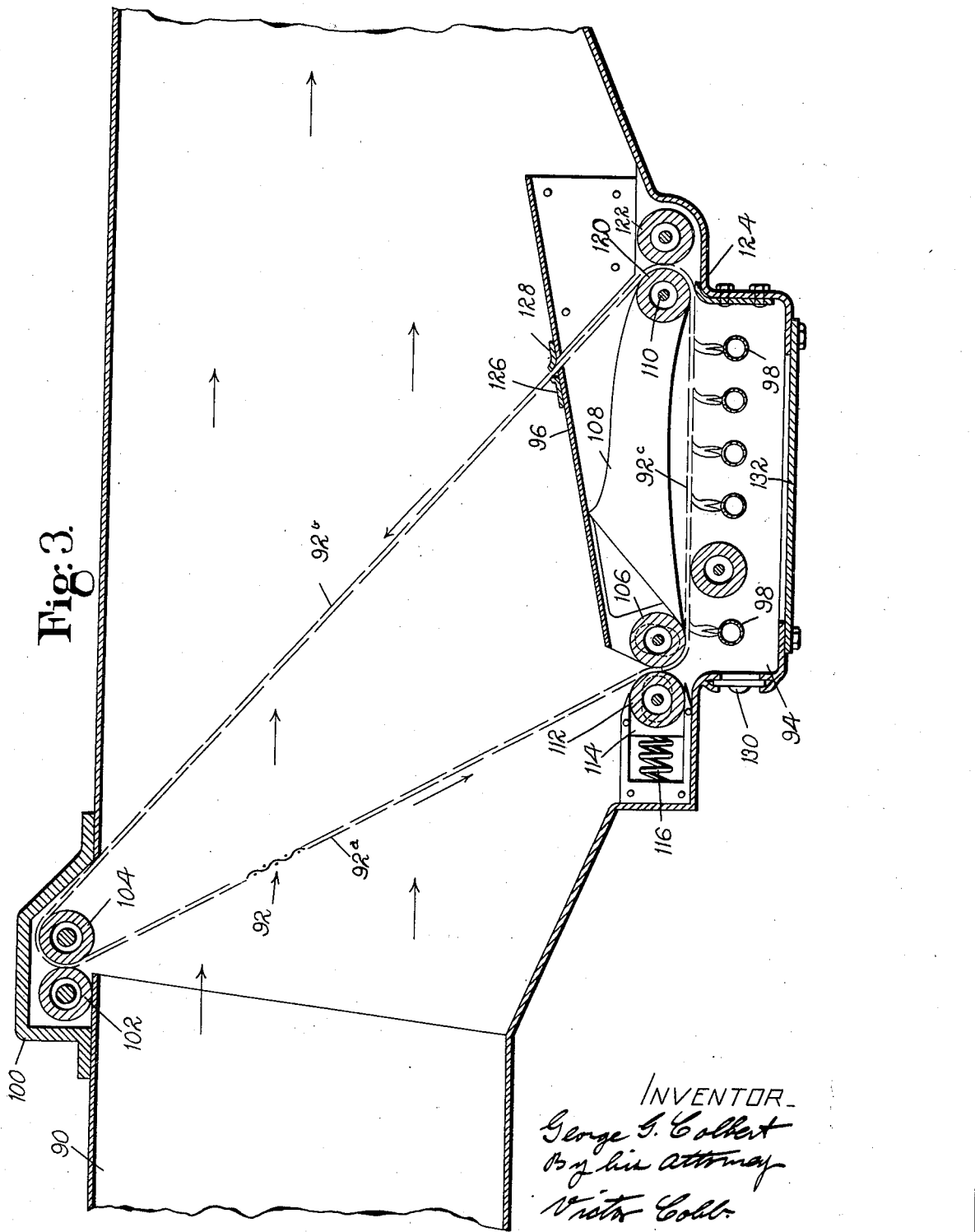

Patented Aug. 20, 1940

2,211,812

UNITED STATES PATENT OFFICE 2,211,812

APPARATUS FOR THE DISPOSAL OF DUST

George G. Colbert, Middleton, Mass., assignor to The Tanning Process Company, Boston, Mass., a corporation of Massachusetts Application March 28, 1938, Serial No. 198,418

12 Claims. (Cl. 183—6)

This invention relates to the disposal of dust arising from manufacturing operations in various industries. The invention is illustrated herein as embodied in an apparatus for screening or filtering dust from dust-laden air and burning it on the screen or filter, and it is to be understood that changes may be made in the latter without departing from the principles of the invention.

It is an object of this invention to provide improved apparatus for the practice of the method disclosed in the copending application Serial No. 198,421, filed March 28, 1938, in the name of R. A. Ruedebush.

It is an important feature of the invention that the screen or filter which collects dust from dust-laden air, in a conduit or other passageway, is movable to carry the dust to a location where it may be burned by suitable means, the arrangement of the screen or filter being such that, while successive portions thereof are collecting dust, other portions of the continuously moving screen or filter are being freed from the dust, preferably through combustion of the latter at a rate which corresponds closely to the rate at which dust is collected by the traveling filter or screen. It is an advantage of this construction that the continuously moving screen presents successively new portions for the collection of dust and for the burning of the dust, thus contributing substantially to an increased capacity for dust disposal.

Conveniently, the traveling screen or filter moves across the entire width of an intake conduit and subsequently past a device for effecting burning of the dust, in an arrangement wherein a baffle plate is provided to deflect the current of air away from the location where the dust is being burned. The baffle plate is distinctly advantageous in that a forced draft of air would be likely to displace dust from the screen or filter before it had been properly burned. Such a draft might even interfere with proper combustion due to lowering of the temperature of the screen or filter and to displacement of the flames in a direction away from the screen or filter, particularly where a gas burner or other similar apparatus is provided to consume the dust.

With these and other features and objects in view, the invention will now be described in detail in the specification and then pointed out more particularly in the appended claims.

In the drawings,

Fig. 3 is a view similar to Fig. 1 showing another embodiment of the invention.

Figure 1:
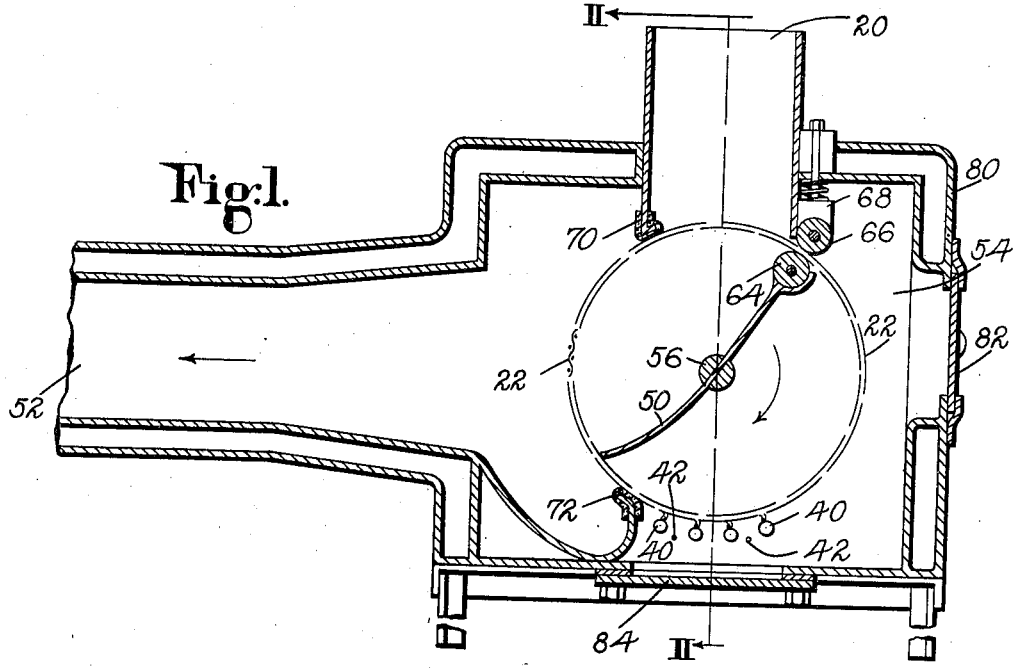
Fig. 1 is a longitudinal sectional view of a dust disposal apparatus illustrating one embodiment of the invention.
Figure 2:
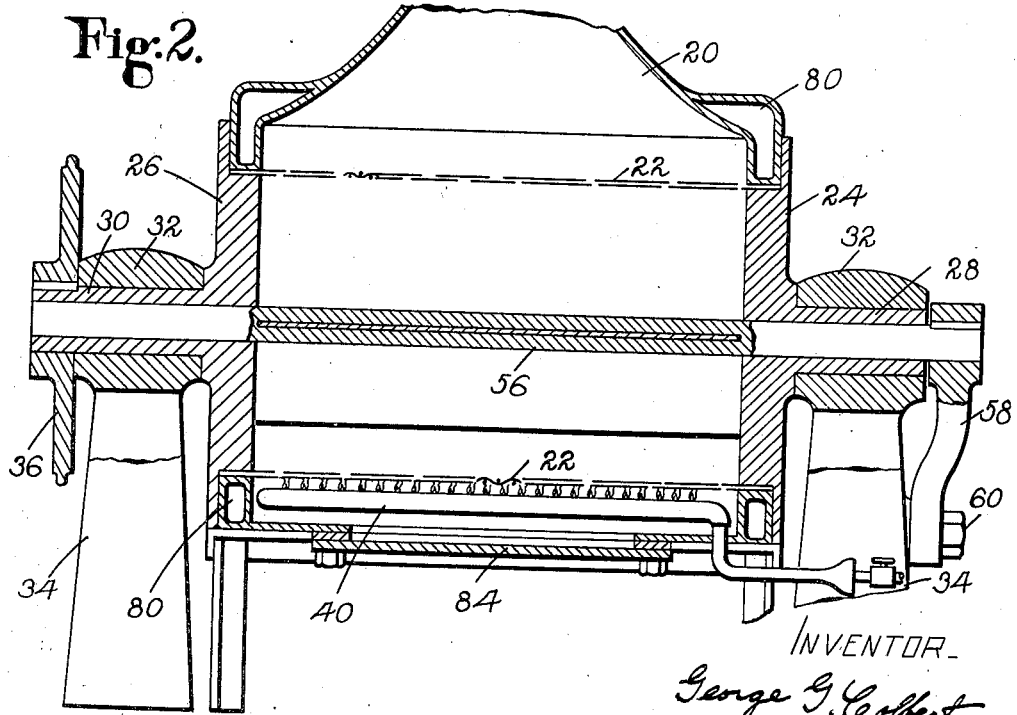
Fig. 2 is a section taken along the line II—II of Fig. 1.

In that embodiment of the invention shown in Fig. 1, there is provided at the inner end of an intake conduit 20 a screen or filter of non-combustible material in the form of a cylinder 22 carried by end members or heads 24, 26 (Fig. 2) each provided with a hub 28, 30, respectively, these hubs turning in bearings 32 at the upper ends of posts or standards 34. Secured to the hub 30 is a sprocket wheel 36 arranged to be driven from any suitable source of power at a rate which is predetermined with relation to the quantity of dust collected on the rotary screen or cylinder 22. It will be readily understood that, during rotation of the cylinder 22, the screen or filter is presenting successive portions of its surface to the dust-laden air coming in through the intake conduit 20.

For fine dust, it is possible to obtain a wire fabric with a mesh of 400 squares to the square inch, commonly spoken of as 400 square mesh, which has a width of opening of .0381 mm. For dust from leather buffing operations, a screen with openings of 1 mm. is quite satisfactory. A filter or screen fabric manufactured of nichrome metal will withstand a heat of 2300° F. However, since the screen or filter fabric is in the burning chamber for only a relatively short time and then passes into a current of cool air, it is not subjected to unbearable conditions and is found to be quite durable.

In the rotation of the rotary screen cylinder 22 in the direction of the arrow (Fig. 1) successive portions of the dust carrying screen or filter are presented in position above a burner device which, in the illustrated construction, is made up of a plurality of gas pipes 40. It is to be understood that the number of these gas pipes may be varied to suit the requirements, having in mind the kind of dust and the quantity thereof which is taken up per unit area of the cylindrical screen or filter. Conveniently, pilot lights 42 are provided adjacent each pair of the gas pipes 40 to insure that no gas will be left unburned in the chamber below the rotary screen or filter and to serve as lighting means when the gas is turned on.

It is a very important feature of the invention that a baffle plate 50 is provided to direct the current of air entering from the intake conduit 20 to a discharge conduit 52 at another side of a chamber 54 in which the rotary screen or filter 22 is located. The baffle plate 50 also serves as a wall member having the special function of preventing the forced draft of air from reaching the burning dust on the rotary screen 22, since a forced draft of air might displace the dust before it was completely consumed. Furthermore, air currents of the force under consideration would be apt to blow the flames downwardly away from the screen, at the same time cooling the latter to an undesirable degree, possibly to such an extent as to interfere with the desired burning of the dust. As shown, the baffle plate 50 is carried by a normally stationary shaft 56 which passes through suitably shaped openings in the heads 24, 26 and hubs 28 and 30. One end of the shaft 56 is extended beyond the hub 28 and has secured thereto an arm 58 which has fastened thereto, by a bolt 60, a handle which is held in engagement with one side of the adjacent post 34 by the weight of a roll 64 at the upper end of the baffle plate 50. By proper manipulation of the arm 58, the shaft 56 may be rocked to move the end surfaces of the baffle plate 50 over the inside surface of the screen or filter to remove charred dust therefrom in cleaning the screen or filter.

Means is provided for preventing the escape of dust-laden air from the intake conduit 20 into the chamber 54, thereby forcing all of the air to pass through the continuously traveling screen or filter cylinder 22. In the illustrated construction, the said means comprises the idler roll 64 conveniently mounted in the upper end of the baffle plate 50 and in rotary contact with the inner surface of the cylinder 22. For cooperation with the roll 64 there is provided a second idler roll 66 carried by bearings in a slidably mounted block 68, the block 68 being spring pressed downwardly so that the roll 66 is yieldingly held in contact with the surface of the cylinder 22 in opposition to the roll 64. These rolls 64, 66 not only prevent or minimize the escape of air into the chamber 54 but serve also to roll the dust into such close contact with the surface of the screen or filter that it is retained thereon until it reaches the burners at 40. At the other side of the intake pipe 20 there is provided a wiper 70 which may be of asbestos or other similar suitable material. This wiper not only seals the end of the intake conduit 20 against the escape of dust-laden air but serves also to wipe off any charred dust which may remain on the outside surface of the screen 22, thus helping to keep the screen in condition to permit air to pass readily therethrough while it is passing across the lower end of the intake conduit 20. Preferably a second wiper 72 is provided in contact with the rotary screen or filter 22 along a line and adjacent to the burners 40 to prevent the escape of any dust from the chamber 54 into the discharge conduit 52 and to wipe charred dust from the surface of the cylinder 22, thus assisting in maintaining the cylinder 22 clear for its function as a screen or filter.

In order to conserve the heat produced as a result of the combustion of the gas and the dust, there is provided a jacket 80 about the chamber 54 and the discharge conduit 52, it being understood that the jacket 80 may be part of a water circulatory system by which this liquid taken from any suitable source may be heated and passed on to a location where its heat may be utilized.

It is to be understood that either the intake conduit 20 or the discharge conduit 52 will be connected with a suitable blower mechanism to cause movement of the dust-laden air through the rotary screen or filter 22.

As shown, the chamber 54 is provided with openings covered by sliding doors 82, 84 for access to the inside of the chamber 54.

In the operation of the apparatus, dust-laden air entering through the intake conduit 20 leaves its dust on the surface of the rotary screen or filter 22 which is constantly presenting new screening or filtering surfaces to the air in the intake conduit. Subsequently, the dust-laden portions of the screen or filter are presented to flames from the burners 40 where the dust is disposed of by being consumed, the smoke from the combustion passing out through a portion of the screen or filter which is located between the wiper 72 and the lower end of the curved baffle plate 50.

In that embodiment of the invention shown in Fig. 3 of the drawings, a conduit 90 arranged to conduct dust-laden air in the direction of the arrows is provided with a moving screen or filter 92 in the form of an endless belt. As shown, the belt screen or filter is arranged to have three runs of which a run 92a is the dust collecting run and a run 92b is the return run which also passes through the conduit. Obviously, the return run may be outside of the conduit (by providing a bend in the latter, for example) if that should be found desirable. In between these two runs there is a run 92c of the belt screen or filter upon which the dust is consumed through heat applied for that purpose. While the run 92c of the screen or filter is shown located in a recess or chamber 94 in one wall of the conduit 90, it is to be understood that it may be located outside of the conduit where it would pass through a chamber similar to that provided by the recess and by a baffle plate 96. This baffle plate serves largely as a wall to protect the burner apparatus from the forced draft of air through the conduit 90 and insures further a higher temperature in the burning chamber where, in the illustrated construction, gas burner pipes 98 are provided in the chamber 94 to furnish flames which heat the traveling screen or filter to the required temperature and which may be so operated as to furnish flames continuously in case a sufficient amount of dust is presented to require a continuous burning flame.

For supporting the traveling screen or filter, there is provided on or adjacent one wall of the conduit 90 a bracket 100 which furnishes bearings for a pair of driven rolls 102, 104, the screen belt 92 passing around the roll 104, and the rolls cooperating to drive the belt in the direction of the arrow. At the lower end of the run 92a there is an idler roll 106 around which the belt passes, the said roll 106 being preferably mounted on a weighted arm 108 pivoted at 110, the arrangement being such that the roll 106 keeps the screen or filter belt 92 taut. Opposite to the roll 106 is a roll 112 mounted in a block 114 slidable in a guideway and pressed upon by a spring 116 adapted to keep the roll 112 yieldingly pressed against the screen or filter at a point opposite to the roll 106, whereby any large particles of dust may be rolled on to the screen or filter and at the same time a closure is provided between the conduit 90 and the recess or burning chamber 94. Between the runs 92b and 92c of the belt 92 there is provided another guiding and supporting roll 120 about which the belt passes. If desired, an idler roll 122 may be provided for contact with the traveling screen or filter along a line on the roll 120.

At the point where the run 92c of the screen or filter leaves the burning chamber 94 there is preferably provided a wiper 124 of asbestos or other similar material. Preferably also the return run 92b passes through the upper wall of the baffle 96 so that wipers 126, 128 may be provided further to remove any charred material from the traveling screen or filter, the purpose being to keep the screen or filter clean with the openings therein unobstructed.

Preferably the burning chamber 94 is provided with openings, each controlled by a suitable shutter 130 to admit air for proper combustion of the dust in the chamber. Conveniently also the bottom of the combustion chamber is provided with a cover 132 which may be readily removed to facilitate cleaning of the burner and removal of carbonized material which was not carried off by the draft in the form of smoke, as indicated in said Fig. 3.

The method of operation of this embodiment of the invention is clear from the description already given. One of the advantages of this embodiment of the invention resides in the fact that the run where the dust is consumed may be of any desired length, thus affording surface sufficient to insure complete disposal of the dust in the combustion chamber. Furthermore, the return run of the screen or filter belt may be disposed outside of the conduit thereby eliminating the dampering effect of the second or return run shown in the illustrated embodiment of the invention.

Having described my invention, what I claim as new and desire to secure by Letters Patent of the United States is:

1. In an apparatus for disposing of dust, a conduit for the reception of dust and dust-laden air, a movable filter or screen of non-combustible material movable through and across said conduit to separate dust from the air passing through said conduit, the arrangement being such that the air passes through two spaced portions of the movable screen, a burner located opposite a restricted part of said movable screen for burning dust collected on said screen, whether on one or both surfaces of the latter, during movement of successive portions of the screen past the burner, whereby constantly renovated portions of the screen are presented for the collection of dust from the air and a wall between said burner and the currents of air passing through said filter or screen to protect the burner from said air currents.

2. In an apparatus for disposing of dust, a conduit for the reception of dust and dust-laden air, a rotary cylindrical filter or screen of non-combustible material located in said conduit to separate dust from the air passing through said conduit, the arrangement being such that the air passes through a portion of the cylindrical surface into the interior of said cylindrical screen and then out of said cylindrical screen through another part of the cylindrical surface, whereby dust will be deposited on both inner and outer surfaces of said rotary cylindrical screen, a burner to effect burning of dust collected on both the inner and outer surfaces of said rotary filter or screen, whereby constantly renovated portions of the screen are presented for the collection of dust from the air and a member serving as a wall between the burner and the current of air passing through said screen.

3. In an apparatus for disposing of dust, a movable filter or screen of non-combustible material, an intake conduit for directing dust-laden air to said filter or screen, said filter or screen being movable to present different parts thereof successively to the full volume of the air current passing through the intake conduit to separate dust therefrom, a burner located adjacent to another part of said movable filter or screen and away from the draft of said intake conduit to cause consumption of the dust on the filter or screen progressively with the travel of the latter, and a common discharge conduit for the air and for the products of combustion of the dust.

4. In an apparatus for disposing of dust, a chamber, an intake conduit opening into said chamber, a movable filter or screen of non-combustible material arranged to move successive portions thereof across the full width of the conduit for progressively collecting dust from the dust-laden air coming into the chamber through said intake conduit, a discharge conduit opening out of said chamber, a baffle plate extending substantially diametrically across the chamber to direct the air which has passed through the screen to the discharge conduit, and means on the other side of the baffle plate from the intake conduit to effect burning of the dust collected on said filter or screen, whereby the baffle plate serves also to protect the burning dust on the screen from a direct blast of air from the intake conduit, the products of combustion also being discharged through the discharge conduit at one side of said baffle plate.

5. In an apparatus for disposing of dust, a chamber, an intake conduit opening into the chamber, an endless filter or screen of non-combustible material located in the chamber at the end of said conduit and movable to pass successive portions thereof across the full width of the intake conduit for progressively collecting dust from the dust-laden air coming into the chamber through said conduit, a baffle plate to direct the air to a discharge outlet, and means located on the side of the baffle plate away from the intake conduit to effect burning of the dust collected on said filter or screen progressively with the movement of the latter past the burning means.

6. In an apparatus for disposing of dust, a chamber, an intake conduit opening into the chamber, a rotary cylindrical filter or screen of non-combustible material located to present successive portions thereof across the full width of said conduit for progressively collecting dust from the dust-laden air coming in through said intake conduit, a baffle plate located inside of the rotary filter or screen to direct the air to a discharge outlet, and a device located on the side of the baffle plate opposite to the intake conduit and adjacent to the filter or screen to cause progressive consumption of the dust collected on the rotary filter or screen.

7. In an apparatus for disposing of dust, an intake conduit, a movable filter or screen of non-combustible material arranged to pass successive portions thereof across the full width of said conduit whereby dust is continuously deposited upon the filter or screen, a baffle plate to direct air which has passed through the screen to an outlet, and means, located on the side of the baffle plate away from the intake conduit, to effect burning of the collected dust on the filter or screen progressively with the movement of the latter, said baffle plate being also movable to effect the removal of charred dust from one surface of the moving filter or screen.

8. In an apparatus for disposing of dust, a chamber, an intake conduit opening into the chamber, a rotary cylindrical filter or screen of non-combustible material having portions thereof continuously passing across the full width of said conduit whereby dust is continuously deposited upon successive portions of the filter or screen, a baffle plate inside of said moving filter or screen, and means located on the side of the baffle plate away from the intake conduit to effect burning of the dust from the filter or screen progressively with the movement of the latter, said baffle plate serving also to remove charred dust from the adjacent surface of the moving screen.

9. In an apparatus for disposing of dust, a chamber, an intake conduit opening into the chamber, an endless filter or screen of non-combustible material having portions thereof continuously passing the end of said conduit and across the full-width thereof, whereby dust is continuously deposited upon successive portions of the filter or screen, a baffle plate inside of the endless filter or screen and extending substantially diametrically across the inside of the screen to direct air passing inwardly through a portion of the screen in an outward direction through another portion of the screen to an outlet from the chamber, and means located on the side of the baffle plate away from the intake conduit to cause burning of the dust on the filter or screen progressively with the travel of the latter.

10. In an apparatus for disposing of dust, an intake conduit, a cylindrical filter or screen of non-combustible material arranged to pass successive portions thereof across the end of said intake conduit and across the full width thereof to separate dust from air passing therethrough, a baffle plate extending approximately diametrically across the cylindrical screen to direct air which has passed through the screen to an outlet, and means located on the side of the baffle plate facing away from the intake conduit for causing burning of the collected dust on the filter or screen progressively with the movement of the latter.

11. In an apparatus for disposing of dust, an intake conduit, a cylindrical filter or screen of non-combustible material arranged to pass successive portions thereof across the end of said intake conduit to separate dust from air passing therethrough, means located adjacent to the end of the intake conduit to prevent escape of dust-laden air between the end of one side wall of the intake conduit and the filter or screen, a wiper at the opposite side wall of the intake conduit to prevent the escape of air at that place and to wipe any charred dust from the outer surface of the filter or screen, a baffle plate inside of the screen to direct air which has passed through the filter or screen to an outlet, and means protected by said baffle plate for causing burning of the collected dust on the filter or screen progressively with the movement of the latter, the baffle plate operating to wipe charred dust from the inner surfaces of the screen.

12. In an apparatus for disposing of dust, a chamber, an intake conduit opening into the chamber, a cylindrical filter or screen of non-combustible material rotatable at the inner end of said conduit to separate dust from air passing therethrough, a discharge conduit located at a substantial angle to the intake conduit, a baffle plate inside of the cylindrical filter or screen to direct air which has passed through the screen from the intake conduit to the discharge conduit, a pair of rollers located at the inner end of the intake conduit and in contact with directly opposed portions of the surfaces of the rotary filter or screen, the inner of said rollers being carried by said baffle plate and the outer of said rollers being mounted on a wall of the intake conduit in position to cover a space between said wall and the adjacent surface of the cylindrical screen to prevent the escape of dust, and means located beyond the baffle plate on the side opposite to the intake conduit to cause consumption of dust collected on the filter or screen continuously with rotation of the latter.

GEORGE G. COLBERT.